US012607284B1

(12) United States Patent
Hsu et al.

(10) Patent No.: US 12,607,284 B1
(45) Date of Patent: Apr. 21, 2026

(54) LIQUID-COOLING QUICK CONNECTOR DEVICE

(71) Applicants: NEXTRONICS ENGINEERING CORP., New Taipei City (TW); NEXTRONICS ENGINEERING(GUANGDONG) CORP., Guangzhou City (CN)

(72) Inventors: Chih-Hsiung Hsu, New Taipei City (TW); Zhi-Hong Deng, Guangzhou City (CN); Ding-Yong Zeng, Guangzhou City (CN); Xiao-Qiong Liao, Guangzhou City (CN)

(73) Assignees: NEXTRONICS ENGINEERING CORP., New Taipei City (TW); NEXTRONICS ENGINEERING(GUANGDONG) CORP., Guangzhou City (CN)

( * ) Notice: Subject to any disclaimer, the term of this patent is extended or adjusted under 35 U.S.C. 154(b) by 0 days.

(21) Appl. No.: 19/214,051

(22) Filed: May 21, 2025

(30) Foreign Application Priority Data

Feb. 18, 2025 (CN) .......................... 202510181682.9

(51) Int. Cl.
*F16L 37/086* (2006.01)
*F16L 37/084* (2006.01)

(52) U.S. Cl.
CPC ......... *F16L 37/086* (2013.01); *F16L 37/0847* (2013.01); *F16L 2201/10* (2013.01)

(58) Field of Classification Search
CPC . F16L 37/086; F16L 37/0847; F16L 37/0841; F16L 37/12; F16L 37/142; F16L 37/144

USPC ......................... 285/81–88, 91, 93, 308–317
See application file for complete search history.

(56) References Cited

U.S. PATENT DOCUMENTS

| | | | | |
|---|---|---|---|---|
| 4,541,457 | A * | 9/1985 | Blenkush | ................ F16L 37/42 |
| | | | | 285/317 |
| 7,845,684 | B2 * | 12/2010 | Gaudin | ............... F16L 37/0841 |
| | | | | 285/317 |
| 11,927,287 | B2 * | 3/2024 | Schröter | ............. F16L 37/0841 |
| 12,535,161 | B2 * | 1/2026 | Schröter | ............... F16L 37/086 |
| 2001/0054819 | A1 * | 12/2001 | Guest | ................. F16L 37/0985 |
| | | | | 285/81 |
| 2025/0012389 | A1 * | 1/2025 | Hartmann | ........... F16L 37/0885 |

* cited by examiner

*Primary Examiner* — James M Hewitt, II
(74) *Attorney, Agent, or Firm* — Li & Cai Intellectual Property Office

(57) ABSTRACT

A liquid-cooling quick connector device includes first and second connectors that are mateable with each other. The first connector includes a first connector body and a locking mechanism having a button body, a top button cover movably disposed on the button body, a locking key movably disposed on the top button cover, a first elastic member disposed between the button body and the first connector body, and a second elastic member disposed between the locking key and the top button cover. When the first and second connectors are being mated, the button body is downwardly movable without unlocking the locking key. Unlocking is not achievable by pressing the top button cover. The locking key needs to be moved (slid) and downwardly pressed for driving the button body to perform unlocking. Accordingly, accidental unlocking is prevented, and mating is allowed when a secondary lock is at a locking position.

9 Claims, 7 Drawing Sheets

LIQUID-COOLING QUICK CONNECTOR DEVICE

CROSS-REFERENCE TO RELATED PATENT APPLICATION

This application claims the benefit of priority to China Patent Application No. 202510181682.9, filed on Feb. 18, 2025, in the People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a liquid-cooling quick connector device, and more particularly to a quick connector device that is adapted for transmission of a coolant and that has a locking function.

BACKGROUND OF THE DISCLOSURE

A liquid-cooling connector device can be disposed in an electronic apparatus for connecting to a water-cooling device and a water conduit. The liquid-cooling connector device includes two connectors that are mateable with each other. In order to ensure stable connection between the two connectors, a locking mechanism is disposed between the two connectors. However, the locking mechanism conventionally does not have a secondary locking function, and is unlocked whenever a slight pressure is applied. As such, accidental unlocking of the connectors cannot be prevented. For locking mechanisms having the secondary locking function, mating cannot be performed when the secondary lock is at a locking position. The secondary lock firstly needs to be slid open before mating, and this process is inconvenient for operation. Furthermore, since the structure of such a secondary lock is complicated, processing and manufacturing costs are high.

SUMMARY OF THE DISCLOSURE

In response to the above-referenced technical inadequacies, the present disclosure provides a liquid-cooling quick connector device that prevents accidental unlocking, allows mating when a secondary lock is at a locking position, and has a simple structure, thereby reducing the costs and facilitating assembly. After a first connector is unlocked, a locking key can automatically return to the locking position without the need for a manual reset.

In order to solve the above-mentioned problems, one of the technical aspects adopted by the present disclosure is to provide a liquid-cooling quick connector device, which includes a first connector and a second connector. The first connector includes a first connector body and a locking mechanism, the locking mechanism includes a button body, a top button cover, a locking key, a first elastic member, and a second elastic member, the button body is disposed on the first connector body, the button body has a body portion, a locking portion is disposed on the body portion, the top button cover is movably disposed on the button body, the locking key is movably disposed on the top button cover, the locking key includes a locking key body and an abutting portion, the abutting portion and the locking key body are integrally formed, and the abutting portion abuts against the first connector body. The locking key limits the top button cover from moving downward and driving the button body downward, so as to prevent unlocking. When the locking key is pushed rearward, the abutting portion disengages from the first connector body, so that the locking key is pressable. The first elastic member is disposed between the button body and the first connector body, and the second elastic member is disposed between the locking key and the top button cover. The second connector includes a fastener body, the first connector is mated with the second connector along a plugging direction, and the locking portion abuts against the fastener body for locking the first connector and the second connector that are mated with each other. When the first connector is being mated with the second connector, the button body is downwardly movable. After mating of the first connector and the second connector is completed, the locking key is automatically locked for locking the first connector and the second connector. Unlocking is performed by moving the locking key to disengage the abutting portion of the locking key from the first connector body, so that the locking key is pressable for disengaging the locking portion of the button body from the fastener body of the second connector.

Therefore, in the liquid-cooling quick connector device provided by the present disclosure, when the first connector is being mated with the second connector, the button body is downwardly movable without unlocking the locking key. Unlocking is not achievable by pressing the top button cover. The locking key needs to be moved and then downwardly pressed for driving the button body to perform unlocking. In the present disclosure, accidental unlocking can be prevented, mating can be performed when the secondary lock is at the locking position, and a specifically-processed metal housing is not needed to fix a button, thereby reducing the costs and facilitating assembly. After the first connector is unlocked, the locking key can automatically return to the locking position without the need for a manual reset.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
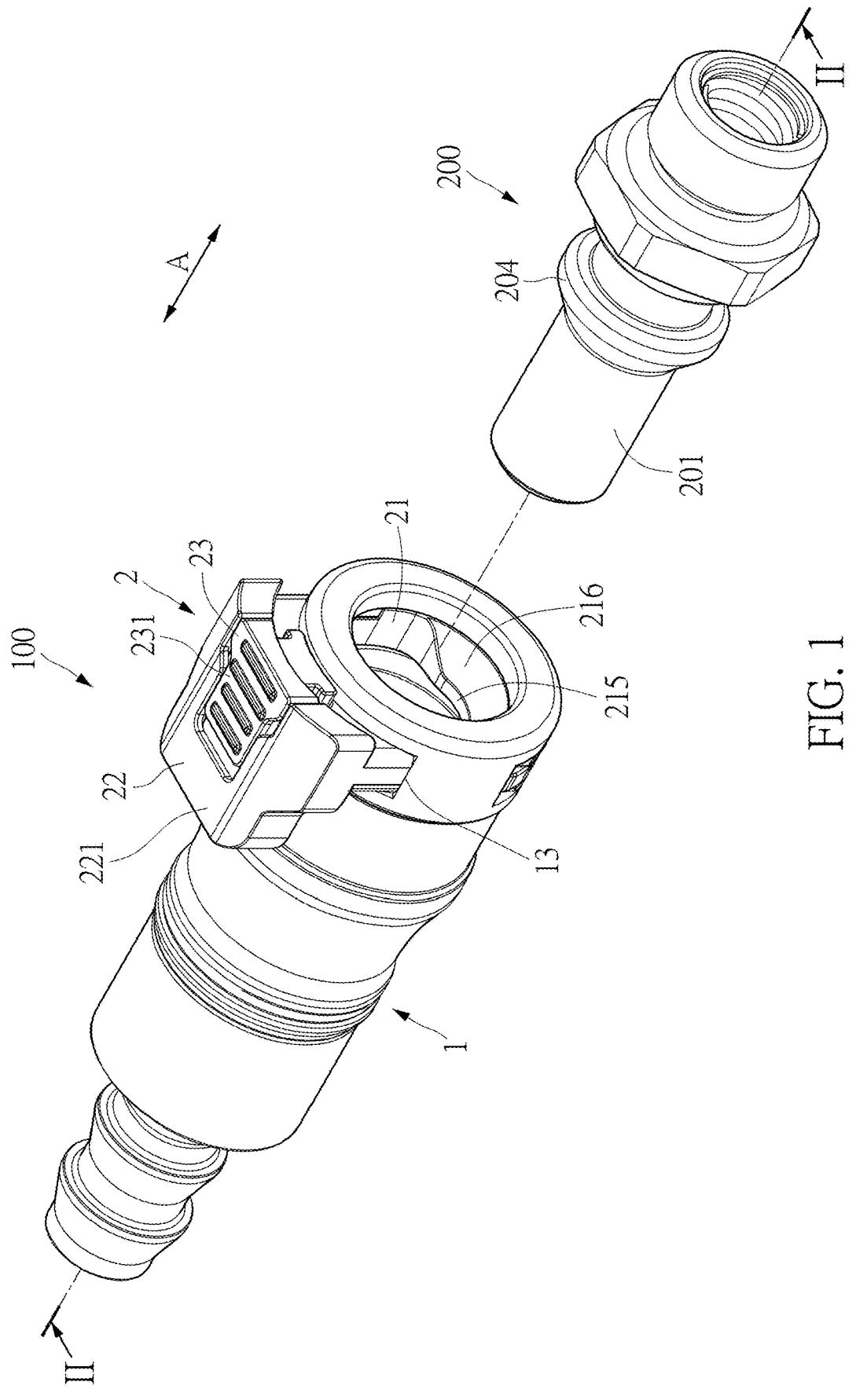
FIG. 1 is a perspective view of a liquid-cooling quick connector device according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

EMBODIMENTS

Figure 2:
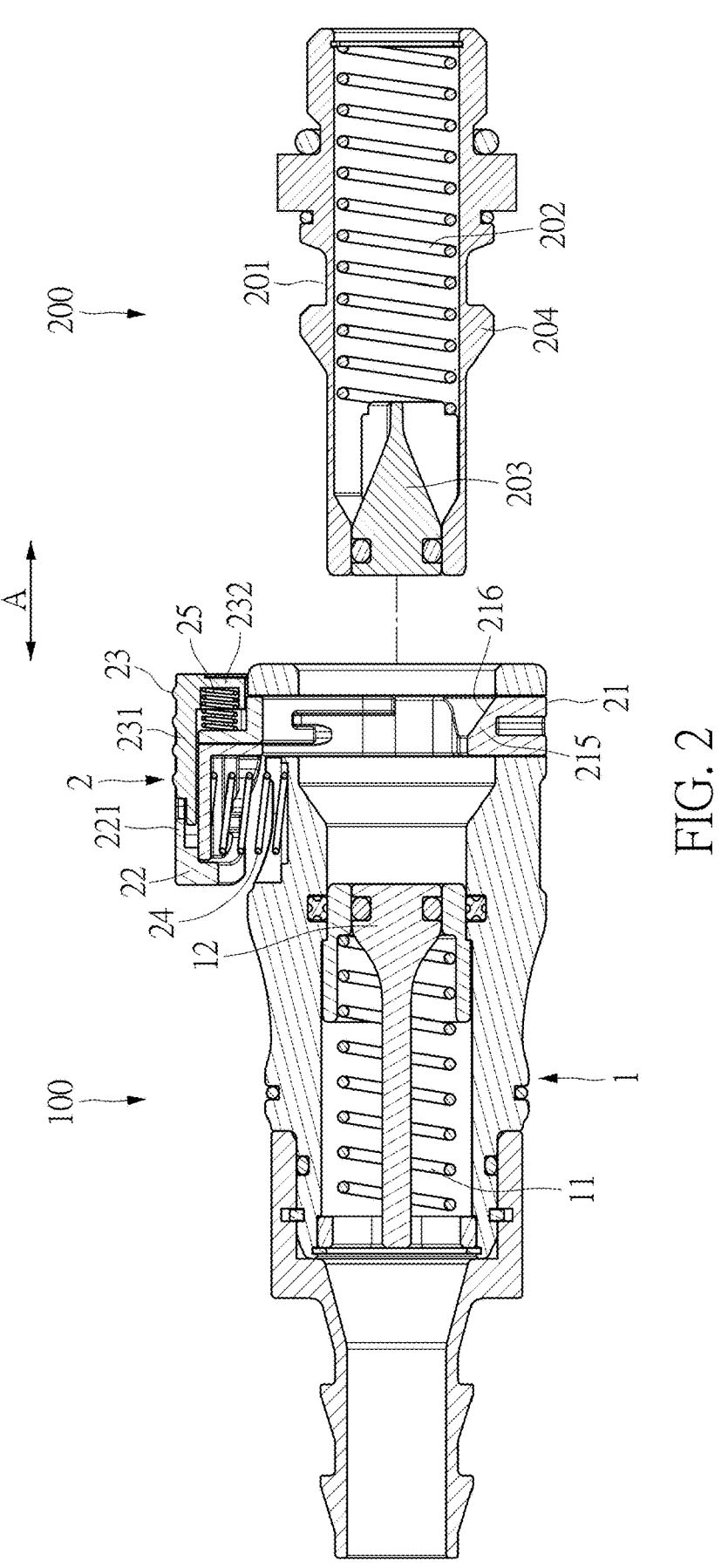
FIG. 2 is a cross-sectional view taken along line II-II of FIG. 1.

Referring to FIG. 1 and FIG. 2, the present disclosure provides a liquid-cooling quick connector device that includes a first connector 100 and a second connector 200. The first connector 100 and the second connector 200 are mateable with each other, and the first connector 100 is mated with the second connector 200 along a plugging direction A.

Figure 3:
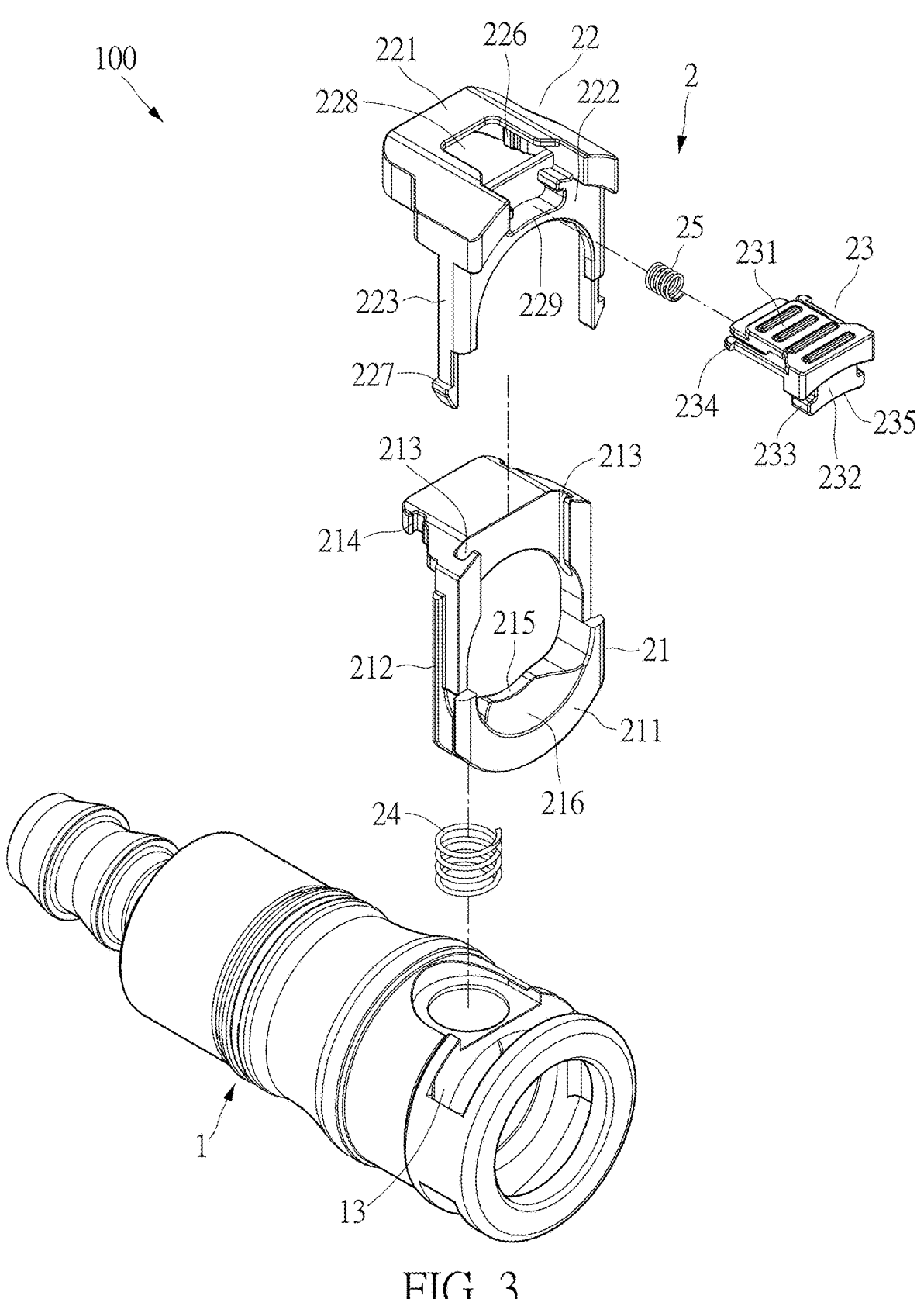
FIG. 3 is an exploded perspective view of a first connector according to the embodiment of the present disclosure.
Figure 4:
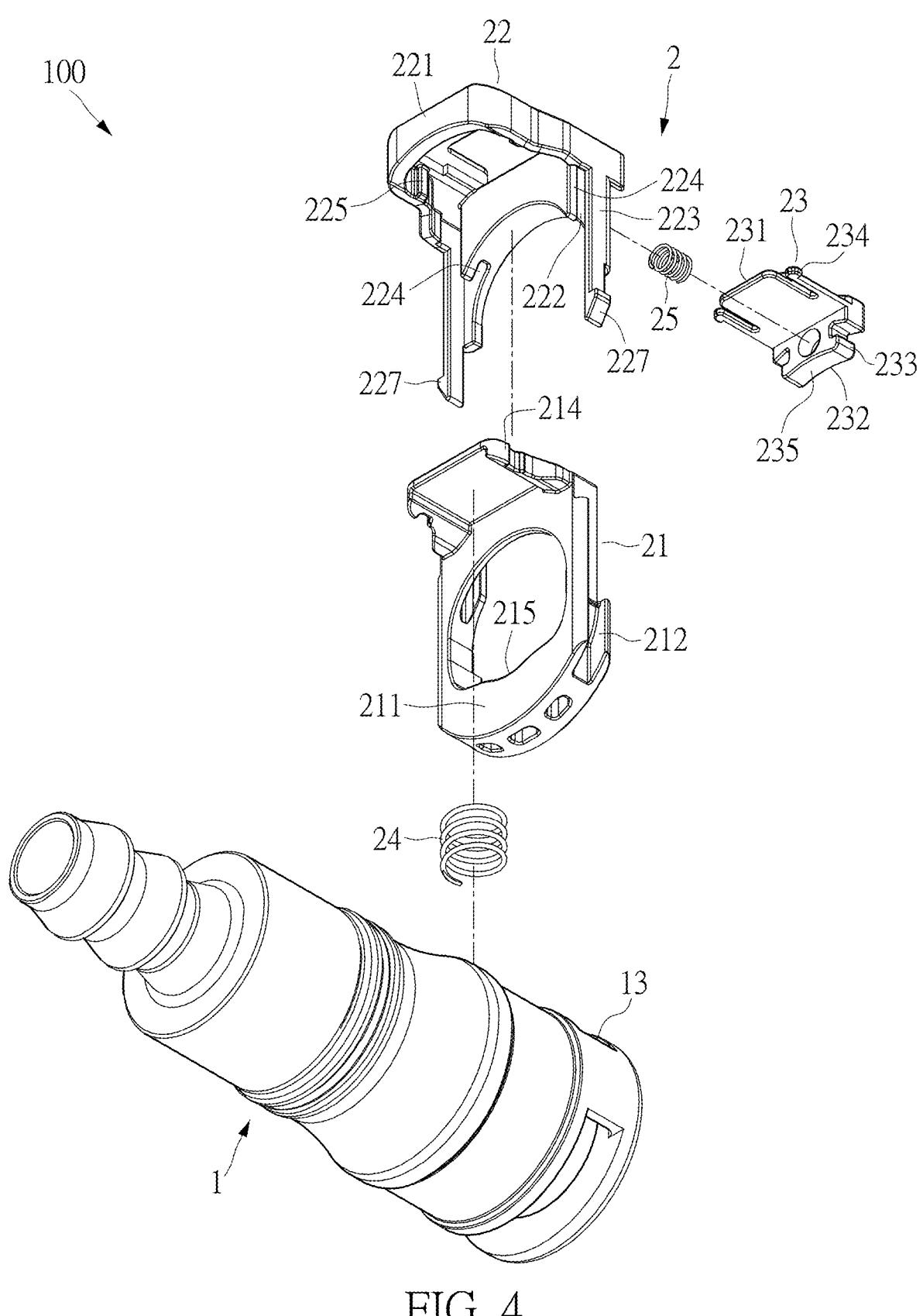
FIG. 4 is an exploded perspective view of the first connector according to the embodiment of the present disclosure from another angle of view.

Referring to FIG. 3 and FIG. 4, the first connector 100 includes a first connector body 1 and a locking mechanism 2. The first connector body 1 can be a female connector and have a metal housing. There is no limitation on the structure of the first connector body 1, which can be any existing connector body used for delivering a coolant. In the present embodiment, a first channel 11 and a first elastic stem 12 are disposed in an interior of the first connector body 1 (as shown in FIG. 2), and the first elastic stem 12 can elastically close off the first channel 11. The second connector 200 includes a second connector body 201, and can be a male connector. There is no limitation on the structure of the second connector body 201, which can be any existing connector body used for delivering the coolant. In the present embodiment, a second channel 202 and a second elastic stem 203 are disposed in an interior of the second connector 201, and the second elastic stem 203 can elastically close off the second channel 202.

The locking mechanism 2 is disposed on the first connector body 1, and includes a button body 21, a top button cover 22, a locking key 23, a first elastic member 24, and a second elastic member 25. The button body 21 is disposed on the first connector body 1, and there is no limitation on the structure that allows the button body 21 to be disposed on the first connector body 1. In the present embodiment, the first connector body 1 has a fixing groove 13, and the button body 21 is assembled in the fixing groove 13, so that the button body 21 can be disposed on the first connector body 1. The button body 21 has a body portion 211, and a locking portion 215 is disposed on the body portion 211, so as to provide a function of locking the second connector 200. An inclined surface 216 is formed on an outwardly-facing surface of the locking portion 215. The locking portion 215 abuts against a fastener body 204 of the second connector 200 for locking the first connector 100 and the second connector 200 that are mated with each other.

In the present embodiment, two first sliding portions 212 are formed on outwardly-oriented positions of two sides of the body portion 211, and two second sliding portions 213 are formed on inwardly-oriented positions of the two sides of the body portion 211. The first sliding portions 212 and the second sliding portions 213 can be sliding slots or sliding rails, so as to provide a guiding effect in a linear motion. There is no limitation on the structure of the first sliding portions 212 and the second sliding portions 213.

The top button cover 22 is movably disposed on the button body 21. The top button cover 22 can move upward or downward relative to the button body 21, and is movable in a direction perpendicular to the plugging direction A. The top button cover 22 includes a top cover body 221 and a bottom base 222, and the bottom base 222 is connected to the top cover body 221. Preferably, the top cover body 221 and the bottom base 222 are respectively superimposed on a top side and a front side of the button body 21, thereby enabling a stable movement of the top button cover 22 on the button body 21 and reducing an occupied space. In the present embodiment, two third sliding portions 223 are formed on outwardly-oriented positions of two sides of the bottom base 222, and two fourth sliding portions 224 are formed on inwardly-oriented positions of the two sides of the bottom base 222. The third sliding portions 223 and the fourth sliding portions 224 can be sliding slots or sliding rails, so as to provide a guiding effect in a linear motion. There is no limitation on the structure of the third sliding portions 223 and the fourth sliding portions 224. Two first barbs 227 are disposed on the two sides of the bottom base 222. When the top button cover 22 is moved upward to a predetermined position, the two first barbs 227 are snap-fitted to the first connector body 1, so as to limit the top button cover 22.

When the top button cover 22 is movably disposed on the button body 21, the first sliding portions 212 and the third sliding portions 223 are in sliding cooperation with each other, and the second sliding portions 213 and the fourth sliding portions 224 are in sliding cooperation with each other, thereby guiding the button body 21 and the top button cover 22 to smoothly move upward or downward. Since a multi-channel sliding and guiding function is provided in the present embodiment, relative displacement between the button body 21 and the top button cover 22 can be precise, and a locking function and an unlocking function can be more accurately achieved.

In the present embodiment, two fifth sliding portions 214 can also be formed on outwardly-oriented positions of a top end of the body portion 211 of the button body 21, and two sixth sliding portions 225 can also be formed on inwardly-oriented positions of two sides of the top cover body 221 of the top button cover 22. The fifth sliding portions 214 and the sixth sliding portions 225 can be sliding slots or sliding rails, so as to provide a guiding effect in a linear motion. There is no limitation on the structure of the fifth sliding portions 214 and the sixth sliding portions 225. The fifth sliding portions 214 and the sixth sliding portions 225 are in sliding cooperation with each other, thereby guiding the button body 21 and the top button cover 22 to smoothly move upward or downward.

Figure 5:
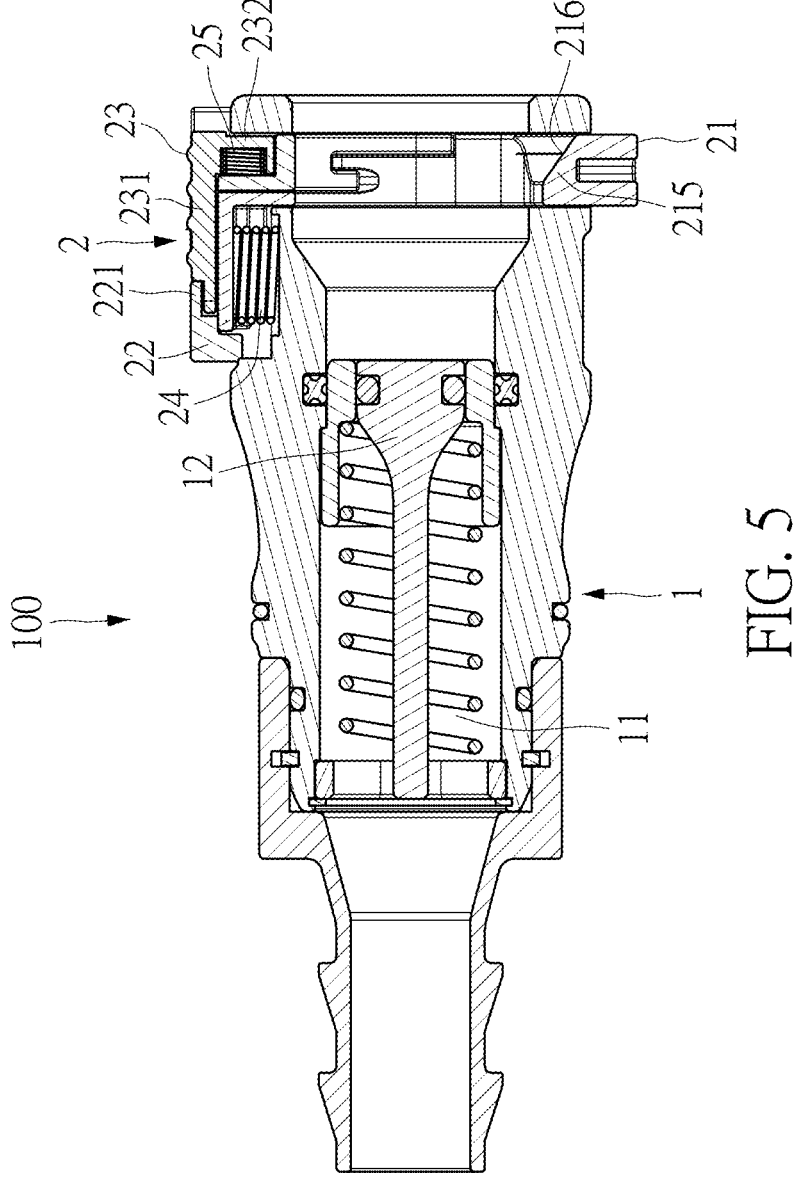
FIG. 5 is a schematic view of the first connector in an unlocked state according to the embodiment of the present disclosure.

The locking key 23 is movably disposed on the top button cover 22, and is movable along the plugging direction A. The locking key 23 includes a locking key body 231 and an abutting portion 232, and the abutting portion 232 and the locking key body 231 are integrally formed. The abutting portion 232 can abut against the first connector body 1, so that the locking key 23 cannot be downwardly pressed. The locking key 23 limits the top button cover 22 from moving downward and driving the button body 21 downward, so as to prevent unlocking. In order to downwardly press the locking key 23, the locking key 23 needs to be pushed rearward for disengaging the abutting portion 232 from the first connector body 1 (as shown in FIG. 5). Preferably, a circular concave surface 235 is formed on a surface of the abutting portion 232 that is adjacent to the first connector body 1, and the abutting portion 232 can abut against the first connector body 1 via the circular concave surface 235, so that the abutting portion 232 contacts the first connector body 1 in a more stable manner. Preferably, an anti-slip stripe can be disposed on a top surface of the locking key body 231, so that the finger can easily push the locking key 23. In the present embodiment, the top button cover 22 has an accommodating space 228, and the locking key 23 is disposed in the accommodating space 228, so as to save a height space taken up by the locking key 23. Due to such configuration, the locking key 23 is less likely to protrude from the top button cover 22, and is provided with a better protection effect. An opening 229 is formed on an end of the accommodating space 228, and the abutting portion 232 of the locking key 23 abuts against the first connector body 1 through the opening 229.

Two seventh sliding portions 233 are formed on two sides of the abutting portion 232, and two eighth sliding portions 226 are formed on inwardly-oriented positions of the two sides of the top cover body 221 of the top button cover 22. The seventh sliding portions 233 and the eighth sliding portions 226 can be sliding slots or sliding rails, so as to provide a guiding effect in a linear motion. There is no limitation on the structure of the seventh sliding portions 233 and the eighth sliding portions 226. When the locking key 23 is disposed on the top button cover 22, the seventh sliding portions 233 and the eighth sliding portions 226 are in sliding cooperation with each other, thereby guiding the locking key 23 to smoothly move forward or rearward on the top button cover 22. Two second barbs 234 are disposed on two sides of the locking key body 231. When the locking key 23 is moved forward to a predetermined position, the two second barbs 234 are snap-fitted to inner sides of the top cover body 221, so as to limit the locking key 23.

The first elastic member 24 and the second elastic member 25 are compression springs. The first elastic member 24 is disposed between the button body 21 and the first connector body 1, and elastically abuts against the button body 21 for enabling the button body 21 to move upward and reset. The second elastic member 25 is disposed between the locking key 23 and the top button cover 22, and abuts against the locking key 23 for enabling the locking key 23 to move forward and reset.

Figure 6:
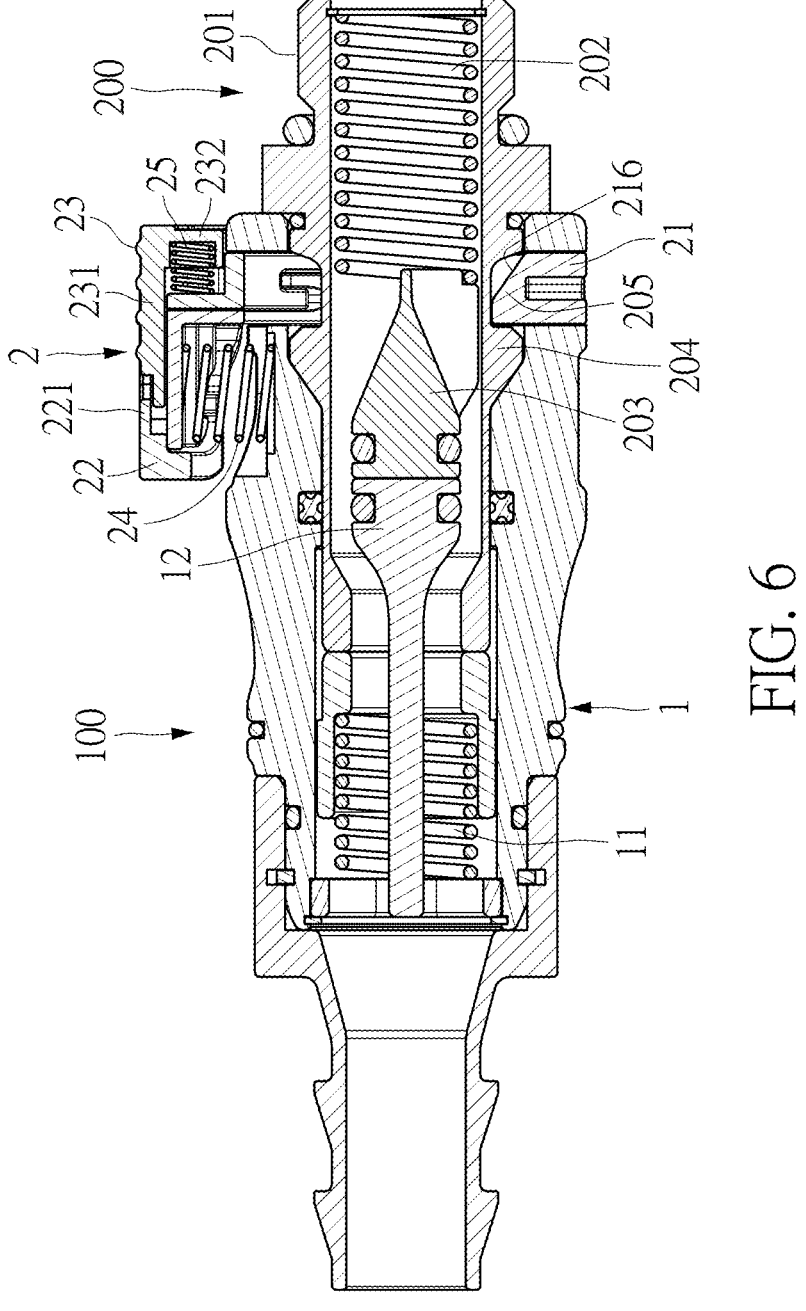
FIG. 6 is a cross-sectional view of the liquid-cooling quick connector device in a mated state according to the embodiment of the present disclosure.

When the first connector 100 is being mated with the second connector 200 (as shown in FIG. 6), the button body 21 will move downward without unlocking the locking key 23. The fastener body 204 of the second connector 200 will abut against the locking portion 215 for enabling the button body 21 to move downward. In addition, after mating of the first connector 100 and the second connector 200 is completed, the first elastic member 24 will push the button body 21 to move upward and reset, and the locking key 23 can be automatically locked for locking the first connector 100 and the second connector 200, so that another manual sliding operation is not needed. Unlocking is not achievable by pressing the top button cover 22. In order to unlock, the locking key 23 firstly needs to be moved (slid) to disengage the abutting portion 232 of the locking key 23 from the first connector body 1. Only then can the locking key 23 be downwardly pressed (as shown in FIG. 5) to drive the button body 21 downward, thereby disengaging the locking portion 215 of the button body 21 from the fastener body 204 of the second connector 200 and being unlocked.

After mating of the first connector 100 and the second connector 200 is completed, the first elastic stem 12 and the second elastic stem 203 will abut against each other and move to open the first channel 11 and the second channel 202. Accordingly, the first connector 100 is in fluid communication with the second connector 200 for delivering the coolant.

Figure 7:
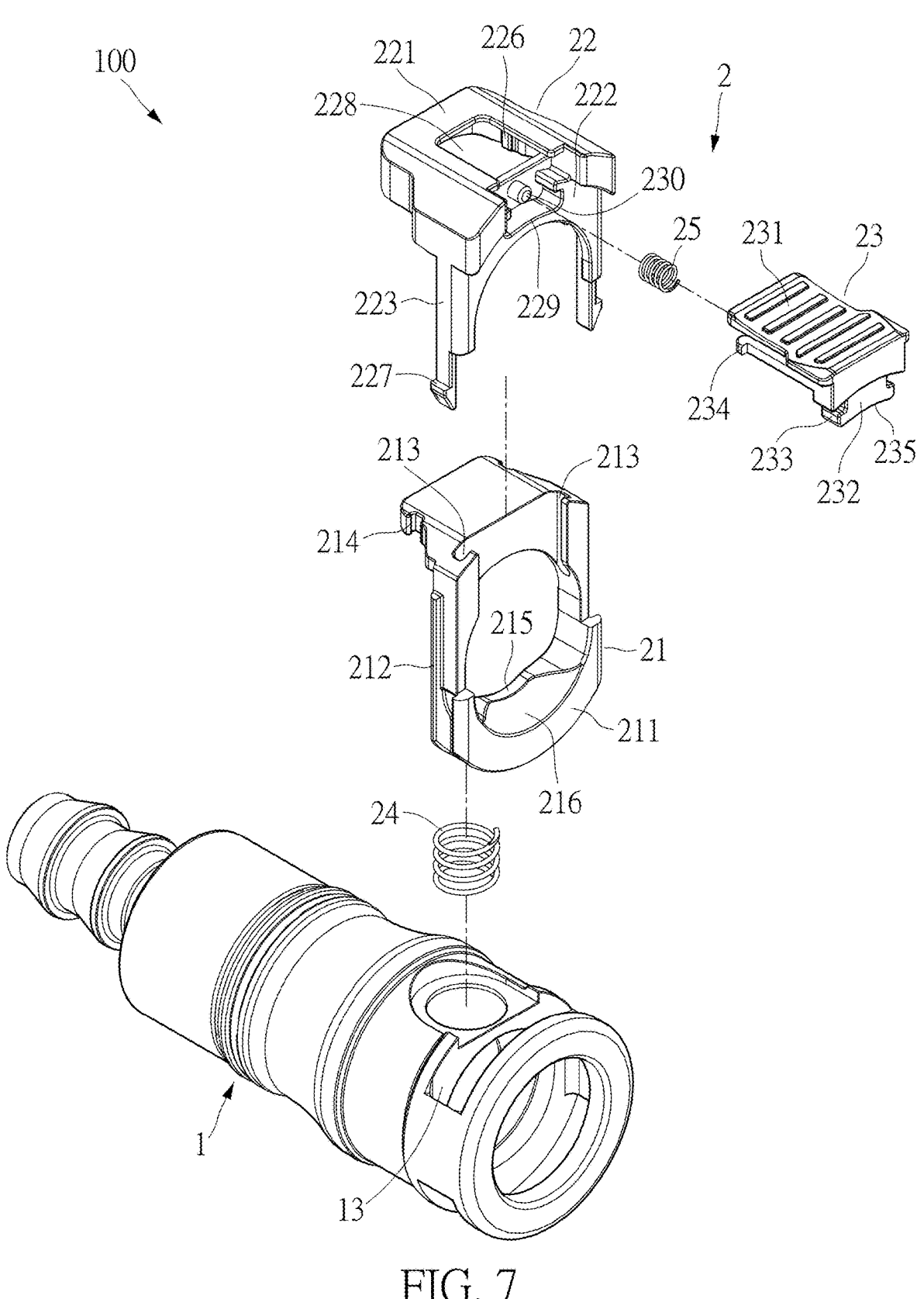
FIG. 7 is an exploded perspective view of the first connector according to another embodiment of the present disclosure.

Reference is made to FIG. 7. In another embodiment of the present disclosure, multiple anti-slip stripes are disposed on the top surface of the locking key body 231 for increasing a finger contact area. A protrusion 230 can also be disposed on the top button cover 22. The protrusion 230 is provided for sleeving and positioning of the second elastic member 25, and is used to limit the second elastic member 25, so as to facilitate assembly and prevent the second elastic member 25 from shifting.

[Beneficial Effects of the Embodiments]

In conclusion, the liquid-cooling quick connector device provided by the present disclosure includes a first connector and a second connector. The first connector includes a first connector body and a locking mechanism. The locking mechanism includes a button body, a top button cover, a locking key, a first elastic member, and a second elastic member. The button body is disposed on the first connector body, the button body has a body portion, a locking portion is disposed on the body portion, the top button cover is movably disposed on the button body, the locking key is movably disposed on the top button cover, the locking key includes a locking key body and an abutting portion, and the abutting portion abuts against the first connector body for limiting the locking key. When the locking key is pushed rearward, the abutting portion disengages from the first connector body, so that the locking key is pressable. When the first connector is being mated with the second connector, the button body is downwardly movable. After mating of the first connector and the second connector is completed, the locking key is automatically locked for locking the first connector and the second connector. Unlocking is performed by moving the locking key to disengage the abutting portion of the locking key from the first connector body, so that the locking key is pressable for disengaging the locking portion of the button body from a fastener body of the second connector. In the present disclosure, accidental unlocking can be prevented, mating can be performed when a secondary lock is at a locking position, and a specifically-processed metal housing is not needed to fix a button, thereby reducing the costs and facilitating assembly. After the first connector is unlocked, the locking key can automatically return to the locking position without the need for a manual reset.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A liquid-cooling quick connector device, comprising:
a first connector, wherein the first connector includes a first connector body and a locking mechanism, the locking mechanism includes a button body, a top button cover, a locking key, a first elastic member, and a second elastic member, the button body is disposed on the first connector body, the button body has a body portion, a locking portion is disposed on the body portion, the top button cover is movably disposed on the button body, the locking key is movably disposed on the top button cover, the locking key includes a locking key body and an abutting portion, the abutting portion and the locking key body are integrally formed, and the abutting portion abuts against the first connector body; wherein the locking key limits the top button cover from moving downward and driving the button body downward, so as to prevent unlocking; wherein, when the locking key is pushed rearward, the abutting portion disengages from the first connector body, so that the locking key is pressable; and wherein the first elastic member is disposed between the button body and the first connector body, and the second elastic member is disposed between the locking key and the top button cover; and
a second connector, wherein the second connector includes a fastener body, the first connector is mated with the second connector along a plugging direction, and the locking portion abuts against the fastener body for locking the first connector and the second connector that are mated with each other;
wherein, when the first connector is being mated with the second connector, the button body is downwardly movable; wherein, after mating of the first connector and the second connector is completed, the locking key is automatically locked for locking the first connector and the second connector; and wherein unlocking is performed by moving the locking key to disengage the abutting portion of the locking key from the first connector body, so that the locking key is pressable for disengaging the locking portion of the button body from the fastener body of the second connector.

2. The liquid-cooling quick connector device according to claim 1, wherein the top button cover has an accommodating space, the locking key is disposed in the accommodating space, an opening is formed on an end of the accommodating space, and the abutting portion of the locking key abuts against the first connector body through the opening.

3. The liquid-cooling quick connector device according to claim 1, wherein a circular concave surface is formed on a surface of the abutting portion that is adjacent to the first connector body, and the abutting portion abuts against the first connector body via the circular concave surface.

4. The liquid-cooling quick connector device according to claim 1, wherein two first sliding portions are formed on outwardly-oriented positions of two sides of the body portion, and two second sliding portions are formed on inwardly-oriented positions of the two sides of the body portion; wherein the top button cover is movable in a direction perpendicular to the plugging direction, the top button cover includes a top cover body and a bottom base, the bottom base is connected to the top cover body, two third sliding portions are formed on outwardly-oriented positions of two sides of the bottom base, and two fourth sliding portions are formed on inwardly-oriented positions of the two sides of the bottom base; and wherein the two first sliding portions and the two third sliding portions are in sliding cooperation with each other, and the two second sliding portions and the two fourth sliding portions are in sliding cooperation with each other.

5. The liquid-cooling quick connector device according to claim 4, wherein two first barbs are disposed on the two sides of the bottom base; and wherein, when the top button cover is moved upward to a predetermined position, the two first barbs are snap-fitted to the first connector body.

6. The liquid-cooling quick connector device according to claim 4, wherein two fifth sliding portions are formed on outwardly-oriented positions of a top end of the body portion, two sixth sliding portions are formed on inwardly-oriented positions of two sides of the top cover body of the top button cover, and the two fifth sliding portions and the two sixth sliding portions are in sliding cooperation with each other.

7. The liquid-cooling quick connector device according to claim 4, wherein two seventh sliding portions are formed on two sides of the abutting portion, two eighth sliding portions are formed on inwardly-oriented positions of two sides of the top cover body of the top button cover, and the two seventh sliding portions and the two eighth sliding portions are in sliding cooperation with each other.

8. The liquid-cooling quick connector device according to claim 4, wherein two second barbs are disposed on two sides of the locking key body; and wherein, when the locking key is moved forward to a predetermined position, the two second barbs are snap-fitted to inner sides of the top cover body, so as to limit the locking key.

9. The liquid-cooling quick connector device according to claim 4, wherein the top cover body and the bottom base are superimposed on a top side and a front side of the button body, respectively.

* * * * *